1

3,250,780
BIS-BENZOXAZOLYETHYL SULFIDE
Charanjit Rai and John B. Braunwarth, Crystal Lake, Ill.,
 assignors, by mesne assignments, to Union Oil Company of California, Los Angeles, Calif., a corporation of California
No Drawing. Filed May 21, 1962, Ser. No. 196,462
1 Claim. (Cl. 260—307)

This invention relates to a new and useful class of compounds comprising the polyaryloxazoles, and to a method of preparation therefor. The compounds of this invention can be represented by the formula:

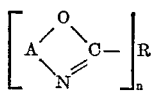

where A is an aromatic nucleus with —O and —N connected in ortho position, $n$ is 2–5, and R is selected from the group consisting of $C_3$–$C_{36}$ alkane, alkene, cycloalkane, and aromatic hydrocarbon radicals, and hydroxy, alkoxy, aryloxy, amino, and halogen derivatives thereof.

Sulfur-containing compounds which are somewhat analogous to the compounds of this invention and their method of preparation are described in our copending application Serial No. 151,190, filed November 9, 1961, and now abandoned. The use of compounds of the type described and claimed herein as intermediates in the preparation of oxacyanine dyes is described in our copending application Serial No. 157,860, filed December 7, 1961, and now abandoned.

One of the objects of this invention is to provide a novel class of polyaryloxazoles.

Another object of this invention is to provide a new and improved process for the preparation of polyaryloxazoles.

A feature of this invention is the provision of a novel class of compounds, the polyaryloxazoles, which includes benzoxazoles, naphthaoxazoles, and polycyclic aromatic analogues thereof containing 2 to 5 aryl oxazole groups per molecule.

Another feature of this invention is the provision of an improved process in which an orthoaminophenol, free of reactive substituents, is condensed with a polycarboxylic acid, or an ester, nitrile, amide, acyl halide, or anhydride of said acid, in the presence of polyphosphoric acid as a catalyst.

Other objects and features of this invention will become apparent from time to time throughout the specification and claims as hereinafter related.

This invention is based upon our discovery that compounds of the general formula above are readily prepared by condensing an orthoaminophenol with a polycarboxylic acid, or an ester, nitrile, amide, acyl halide, or anhydride thereof, in the presence of polyphosphoric acid at a temperature of about 100° to 250° C. The process permits the ready preparation of compounds which could not be prepared heretofore and as a result the compounds themselves are novel. The process is carried out in the presence of polyphosphoric acid as a condensation catalyst, and preferably in the presence of a sufficient amount of polyphosphoric acid to function as the reaction medium. The polyphosphoric acid which is used as the catalyst in the reaction is a commercial product consisting of a liquid mixture of polymeric phosphoric acids having a $P_2O_5$ content in the range from about 72–90%, preferably about 82–84%.

The orthoaminophenols which are used as starting reagents in the preparation of the novel compounds of this invention are of the formula:

where —OH and —$NH_2$ are in ortho position, and A is an aromatic nucleus, preferably selected from the group consisting of monocyclic, bicyclic, and tricyclic aromatic hydrocarbon nuclei and derivatives thereof containing unreactive substituents selected from the group consisting of lower aryl and alkyl radicals, including radicals fused to the aromatic nucleus, halogen, alkoxy, and aryloxy. Orthoaminophenols within the scope of the above formula which can be used in this process include the following, but are not limited thereto:

ORTHO-AMINOPHENOLS

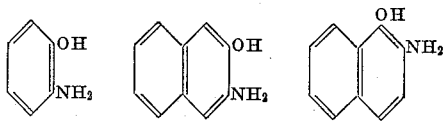

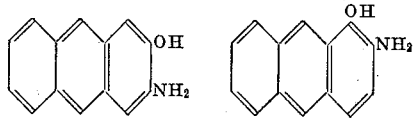

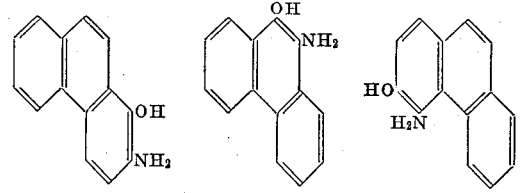

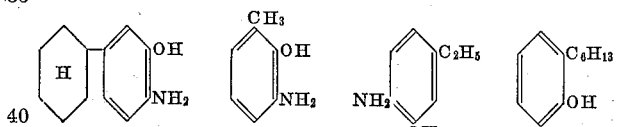

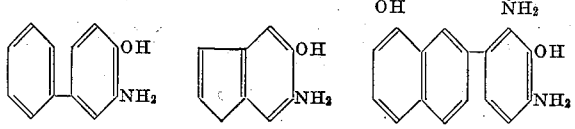

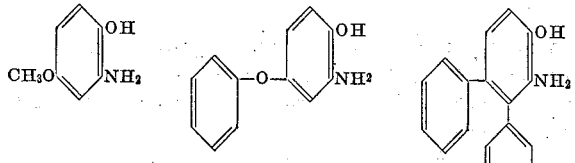

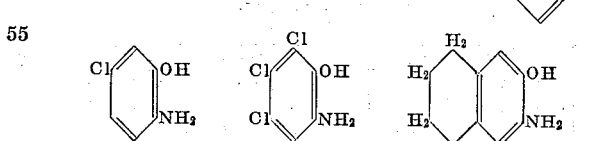

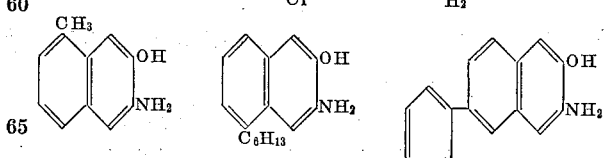

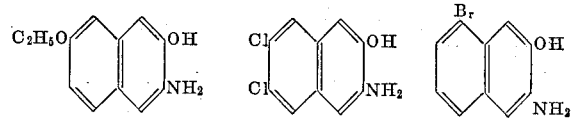

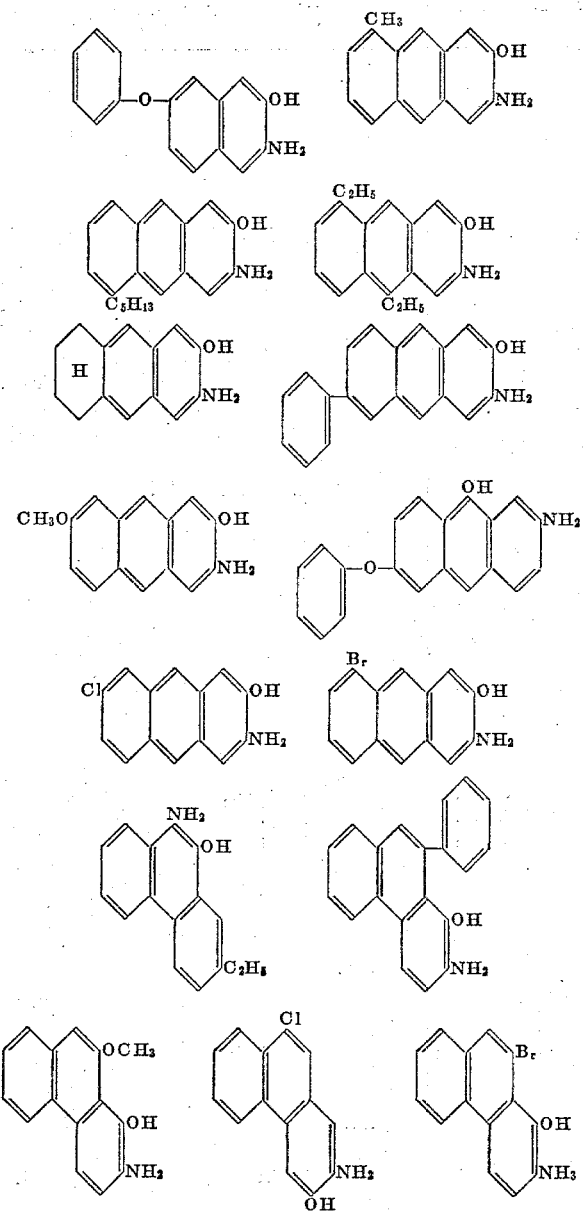

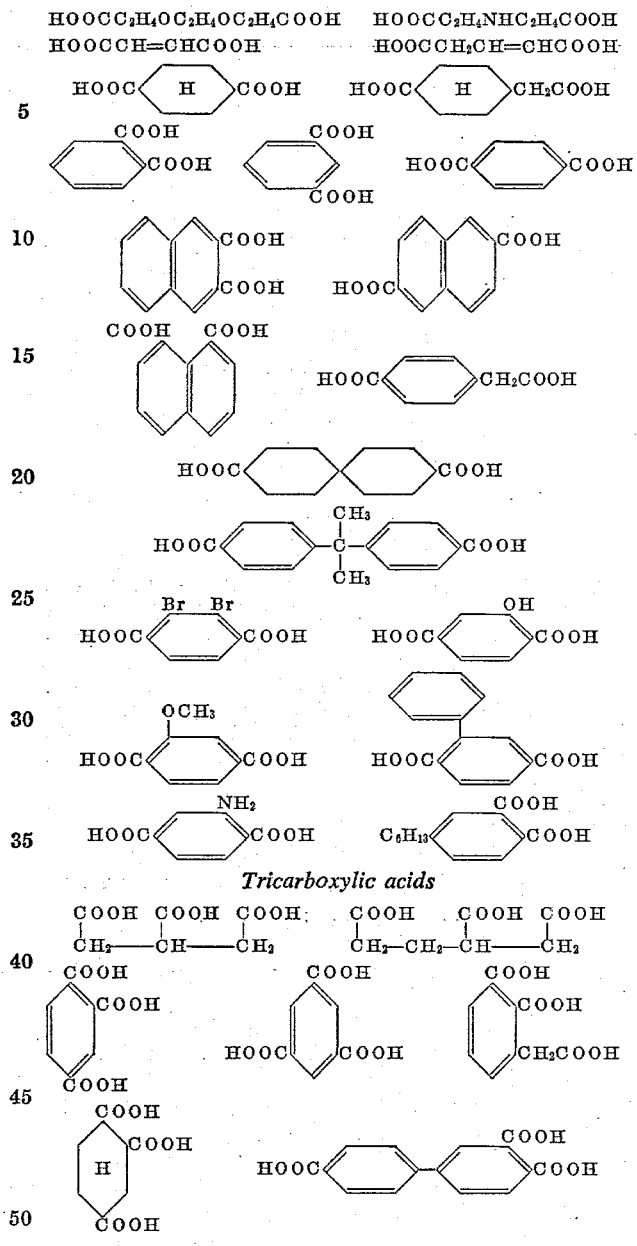

Likewise, in carrying out this reaction the following polycarboxylic acids are illustrative of the acids which can be condensed with the ortho-aminophenols to produce polyaryloxazoles:

POLYCARBOXYLIC ACIDS

*Dicarboxylic acids*

HOOCCH₂COOH     HOOCCH₂CH₂COOH
HOOC(CH₂)₃COOH     HOOC(CH₂)₄COOH
HOOC(CH₂)₅COOH     HOOC(CH₂)₆COOH
HOOC(CH₂)₇COOH     HOOC(CH₂)₈COOH
HOOC(CH₂)₉COOH     HOOC(CH₂)₁₀COOH

Dimerized oleic acid (Emery Industries' Dimer (C–36) acid)
Dimerized linolenic acid

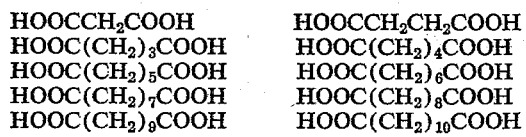

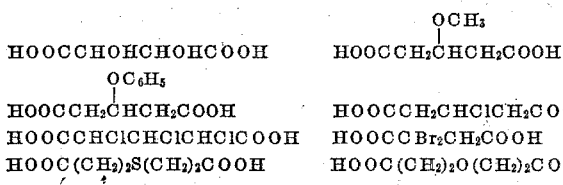

*Tricarboxylic acids*

*Tetracarboxylic acids*

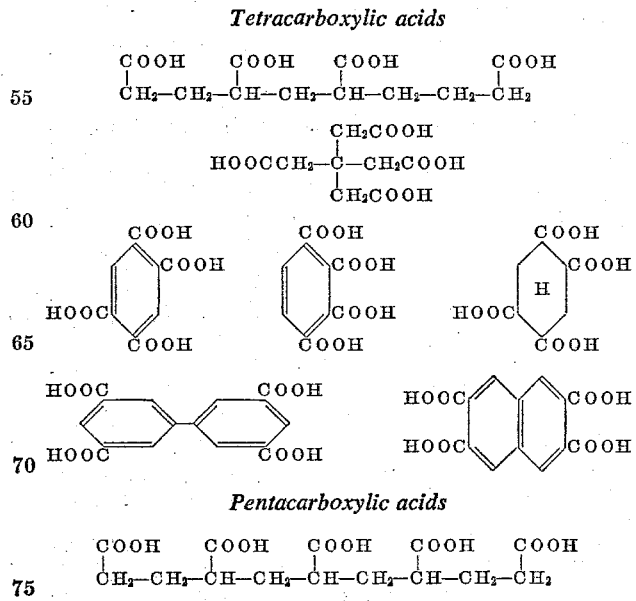

*Pentacarboxylic acids*

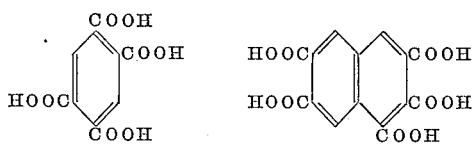

Nitriles, amides, acyl halides, acid anhydrides and esters of polycarboxylic acids can be substituted for the acids in the condensation with aminophenols to yield polyaryloxazoles. Representative compounds within these classes are set forth as follows:

*Nitriles*

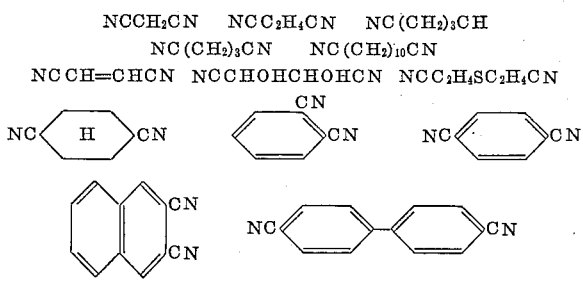

*Amides*

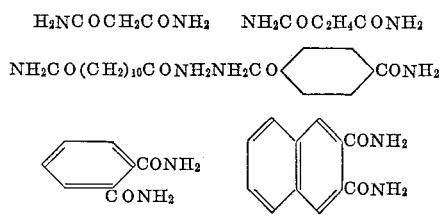

*Acyl halides*

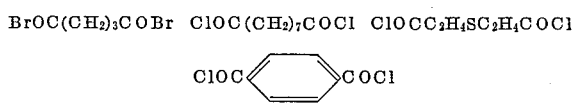

*Anhydrides*

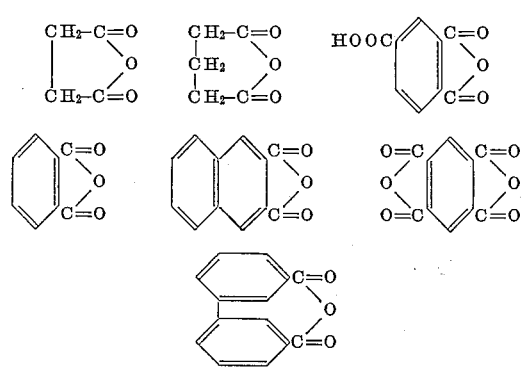

*Esters*

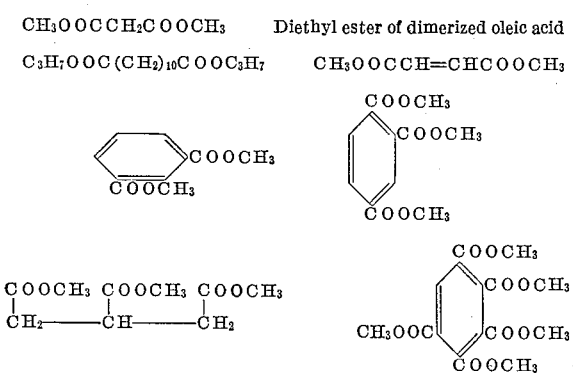

In carrying out this reaction, it is only necessary to mix and heat the ortho-aminophenol and polycarboxylic acid, or nitriles, amides, acyl halide, anhydride, or esters thereof, in the presence of polyphosphoric acid. In general, reaction periods ranging from less than ½ hour to about 3 or 4 hours are adequate for the reaction to go substantially to completion at temperatures of 100°–250° C. The severity of conditions required to effect reaction depends upon the particular reactants and is selected to avoid undesirable side reaction. Preferably, the polyphosphoric acid is used in sufficient quantity to function as the reaction medium, in addition to serving as the catalyst. The principle reason for using polyphosphoric acid as the reaction medium is that it has low solubility in other non-reacting solvents. By using the polyphosphoric acid as the reaction medium, a homogeneous reaction system is obtained and the reaction carried out smoothly. However, the polyphosphoric acid may be used in smaller, catalytic amounts, in admixture with other solvents if so desired.

The following non-limiting examples are illustrative of the scope of this invention.

EXAMPLE I 1-aminophenol (0.2 mole) was mixed with oxalic acid (0.1 mole), and the mixture was poured into well-stirred polyphosphoric acid (125 ml.) contained in a three-necked flask maintained at about 70° C. The reaction mixture was heated to 175° C. for one hour and poured on ice. The precipitate was fitlered off, washed several times with water, and then dried in a vacuum desiccator. The crude product was crystallized from ethanol until a constant melting point was obtained. The product, which was obtained at a crude yield of 28.1%, was bis(2-benzoxazole),

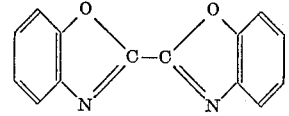

having a melting point in excess of 300° C.

EXAMPLE II 1-aminophenol (0.2 mole) was mixed with malonic acid (0.1 mole), and the mixture was poured into well-stirred polyphosphoric acid (125 ml.) contained in a three-necked flask maintained at 70° C. The reaction mixture was heated at 175° C. for one hour and then poured over ice. The precipitate which formed was recovered by filtration, washed several times with water, and then dried in a vacuum desiccator. The crude product (obtained in a yield of 52.3%) was recrystallized from ethyl alcohol until a constant melting point was obtained. The product was identified by elemental analysis and molecular weight as being

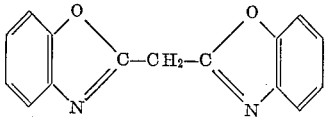

having a melting point of 116° C.

EXAMPLE III 1-aminophenol (0.2 mole) was mixed with succinic acid (0.1 mole), and the mixture was poured into well-stirred polyphosphoric acid (125 ml.) contained in a three-necked flask maintained at 70° C. The reaction mixture was heated to 175° C. for one hour, with stirring. The precipitate thus formed (crude yield 80.5%) was filtered off, washed several times with water, and then dried in a vacuum desiccator. The crude product was crystallized from ethyl alcohol until a constant melting point was obtained, and was identified by elemental analysis and molecular weight. The product obtained in this reaction was bis(2-benzoxazolyl)ethane,

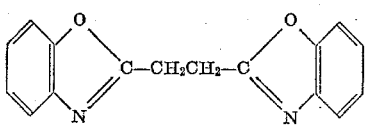

having a melting point of 193.5° C.

EXAMPLE IV

The procedure of Example III was repeated, except that succinonitrile was substituted for succinic acid as a reactant. The conditions of reaction were otherwise the same as in Example III. In this experiment, bis(2-benzoxazolyl)ethane was obtained in a yield of 79.1%.

In another experiment, the procedure of Example III was repeated with succinic anhydride being substituted for succinic acid. In this run, bis(2-benzoxazolyl)ethane was obtained in a yield of 85.2%. In each of these experiments, the product was characterized by elemental analysis and molecular weight, and had the same melting point, 193.5° C., as the product obtained in Example III.

EXAMPLE V

The procedure of Example III is repeated, except that the diamide of succinic acid is substituted for succinic acid as a reactant. The reaction conditions are otherwise the same as in Example III. Under these conditions, bis(2-benzoxazolyl)ethane is obtained in excellent yield.

When succinyl chloride (the diacyl chloride) is substituted for succinic acid in the above reaction, bis(2-benzoxazolyl)ethane is obtained in excellent yield.

EXAMPLE VI 1-aminophenol (0.2 mole) and dimethyl succinate (0.1 mole) are mixed and poured into well-stirred polyphosphoric acid (125 ml.) contained in a three-necked flask maintained at 70° C. The reaction mixture is heated to 175° C. for one hour, with stirring. During the reaction period, methanol is continuously evolved from the reaction mixture. At the end of the reaction, the mixture is poured over ice, and the precipitate which forms is washed several times with water and dried in a vacuum desiccator. The product is crystallized from ethyl alcohol until a constant melting point is obtained. The product obtained by this procedure is bis(2-benzoxazolyl)ethane, having the same properties as the product obtained in Examples III to V.

EXAMPLE VII

A number of bis(2-benzoxazolyl)alkanes were prepared following the procedure described in Examples I to III. The results of these several experiments are set forth in Table I.

TABLE I

*α,ω-Bis(2-benzoxazolyl)alkanes and related compounds*

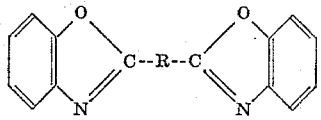

| Dicarboxylic acid reacted with 1-aminophenol | R | Product of the formula | Crude yield, percent | M.P., ° C. |
|---|---|---|---|---|
| Glutaric | $(CH_2)_3$ | $C_{17}H_{14}N_2O_2$ | 88.0 | 70–71 |
| Adipic | $(CH_2)_4$ | $C_{18}H_{16}N_2O_2$ | 86.4 | 128–29 |
| Pimelic | $(CH_2)_5$ | $C_{19}H_{18}N_2O_2$ | 80.2 | 55 |
| Suberic | $(CH_2)_6$ | $C_{20}H_{20}N_2O_2$ | 85.8 | 106.5 |
| Azelaic | $(CH_2)_7$ | $C_{21}H_{22}N_2O_2$ | 92.9 | 47–5 |
| Sebacic | $(CH_2)_8$ | $C_{22}H_{24}N_2O_2$ | 98.8 | 113 |
| Dodecandioic | $(CH_2)_{10}$ | $C_{24}H_{28}N_2O_2$ | 93.0 | 110–11 |
| Maleic | HC=CH | $C_{16}H_{10}N_2O_2$ | 60.5 | 169–7 |
| Tartaric | CHOHCHOH | $C_{16}H_{12}N_2O_4$ | 52.8 | 147–49 |
| Phthalic | $O-C_6H_4$ | $C_{20}H_{12}N_2O_2$ | 60.2 | 177–78 |
| Phthalic anhydride | $O-C_6H_4$ | $C_{20}H_{12}N_2O_2$ | 72.3 | 178 |
| Terephthalic | $p-C_6H_4$ | $C_{20}H_{12}N_2O_2$ | 86.8 | >300 |
| Thiodipropionic | $(CH_2)_2S(CH_2)_2$ | $C_{18}H_{16}N_2O_2S$ | 80.1 | 95–96 |

In carrying out these reactions, it was found that as the length of the alkylene chain between the two benzoxazolyl nuclei was increased, the preparation of the compounds became easier and, in many cases the yield increased.

EXAMPLE VIII 1-aminophenol (0.2 mole) and dimerized oleic acid (a dibasic acid having 36 carbon atoms and containing a straight chain of 18 carbon atoms between the carboxyl groups) are mixed and poured into well-stirred polyphosphoric acid (125 ml.) contained in a three-necked flask maintained at 70° C. The reaction mixture is heated to 200° C. for one hour, with sufficient stirring. The reaction mixture is then poured over ice and the precipitate which forms is filtered off, washed several times with water, and then dried in a vacuum desiccator. The crude product is crystallized from ethanol until a constant melting point is obtained. The product which is obtained has the formula:

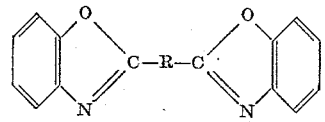

where R is the nucleus of a dimerized oleic acid molecule.

EXAMPLE IX

In another series of experiments, bis-(benzoxazolyl) benzenes were prepared in substantially the same manner as Examples I to III. A mixture of 1-aminophenol (0.25 mole) and phthalic acid, phthalic anhydride, or terephthalic acid (0.125 mole) was added to well-stirred polyphosphoric acid maintained at 80° C. The reaction mixture was heated to 150° C. for a suitable reaction time. The crude product was worked up as in Examples I to III, and was recrystallized from ethanol until a constant melting point was obtained. The reaction conditions and product obtained in these reactions are set forth in Table II below:

TABLE II

*Bis(2-benzoxazolyl)benzenes*

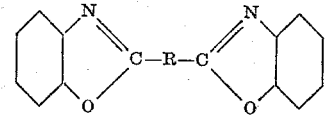

| Acid or anhydride used | Reaction time, hr. | R | Product formula | Crude yield, percent | M.P., ° C. |
|---|---|---|---|---|---|
| Phthalic | 1 | $1,2-C_6H_4$ | $C_{20}H_{12}N_2O_2$ | 60.2 | 177–78 |
| Phthalic anhydride | 1 | $1,2-C_6H_4$ | $C_{20}H_{12}N_2O_2$ | 72.3 | 178 |
| Terephthalic | 2 | $1,4-C_6H_4$ | $C_{20}H_{12}N_2O_2$ | 86.8 | >300 |

EXAMPLE X

When other aminophenols and other dicarboxylic acids are substituted in this process, analogous bis(aroxazoles) are obtained. In carrying out the reaction with other compounds, the procedure described in Examples I to III is generally followed. A mixture of an aminophenol (in which the amino and hydroxy groups are in ortho position), 0.2 mole, and a dicarboxylic acid, anhydride, diester, dinitrile, acyl halide, or acyl amine, 0.1 mole, is poured into well-stirred and warm (70° C.) polyphosphoric acid. The mixture is heated to 100°–250° C. for one hour and then poured on ice. The precipitate which forms is filtered off and worked up as in Examples I to III. The crude product is crystallized from ethanol until a constant melting point is obtained. In Table III, which follows, the reactants and resulting products are tabulated.

TABLE III $$A \underset{N}{\overset{O}{\diagup}} C-R-C \underset{N}{\overset{O}{\diagdown}} A$$

| Reactant aminophenol $A\underset{NH_2}{\overset{OH}{\diagup}}$ | Acid, anhydride, etc. $R(COOH)_2R\underset{C=O}{\overset{C=O}{\diagup}}O$, etc. | R | Empirical product formula |
|---|---|---|---|
| CH₃, OH, NH₂ (methyl aminophenol) | naphthalene-COOH, COOH | naphthyl | $C_{20}H_{18}N_2O_2$ |
| C₆H₁₃, OH, NH₂ | HOOC—CyC₆H₁₀—COOH | cyclohexyl (H) | $C_{32}H_{42}N_2O_2$ |
| Cy—C₆H₁₁—⌬—OH, NH₂ | HOOC(CH₂)₉COOH | —(CH₂)₉— | $C_{35}H_{48}N_2O_2$ |
| φ—⌬—OH, NH₂ | HOOC—⌬—CH₂COOH | —⌬—CH₂— | $C_{33}H_{22}N_2O_2$ |
| Cl, OH, NH₂ | HOOC—⌬—C(CH₃)₂—⌬—COOH | —⌬—C(CH₃)₂—⌬— | $C_{29}H_{20}Cl_2N_2O_2$ |
| Cl, Cl, OH, Cl, NH₂, Cl | HOOC(CH₂)₁₀COOH | —(CH₂)₁₀— | $C_{24}H_{20}Cl_8N_2O_2$ |
| OH, NH₂ | HOOC—⌬(Oφ)—COOH | —⌬(Oφ)— | $C_{26}H_{18}N_2O_2$ |
| CH₃, OH, NH₂ | naphthalene anhydride (C=O, O, C=O) | naphthyl | $C_{26}H_{18}N_2O_2$ |
| OH, NH₂ | CN—⌬(H)—CN | —⌬— | $C_{26}H_{16}N_2O_2$ |

TABLE III

When fused ring aminophenols, viz., aminonaphthols, aminoanthrols, aminophenanthrols, etc., (wherein the amino group is ortho to the hydroxy group) are used in this process, a wide variety of new compounds are produced. Many novel compounds within this general class have been prepared following generally the reaction procedure described in Examples I to III. 1-amino-2-naphthol hydrochloride (0.025 mole) was mixed with a dicarboxylic acid (0.0125 mole), and the resulting mixture was poured into well-stirred polyphosphoric acid (50 ml.) contained in a three-necked flask at ambient temperature. The reaction mixture was then heated at 150–225° C. for 1 to 3 hours. The reaction mixture was poured over ice, and the resulting precipitate was separated by filtration, washed several times with water, and dried in a vacuum desiccator. The product naphthoxazole was purified by recrystallization from ethanol or benzene until the melting point of the product became constant. In Table IV, below, there are listed the several acids which were reacted with 1-amino-2-naphthol hydrochloride to yield the novel compounds of this invention.

TABLE IV

α,ω-Bis(2-naphthoxazolyl)alkanes and related compounds

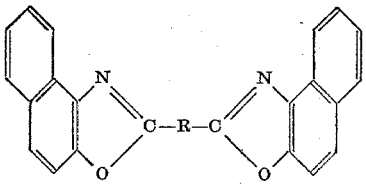

| Dicarboxylic acid reacted with 1-amino-2-naphthol | R | Product Formula | Crude yield | M.P., °C. |
|---|---|---|---|---|
| Succinic | (CH₂)₂ | C₂₄H₁₆N₂O₂ | 33 | 190 |
| Adipic | (CH₂)₄ | C₂₆H₂₀N₂O₂ | 40 | 155 |
| Suberic | (CH₂)₆ | C₂₈H₂₄N₂O₂ | 20 | 137 |
| Sebacic | (CH₂)₈ | C₃₀H₂₈N₂O₂ | 28 | 105 |
| Phthalic | Ortho—C₆H₄ | C₂₈H₁₆N₂O₂ | 57 | 164 |
| Terephthalic | Para—C₆H₄ | C₂₈H₁₆N₂O₂ | 37 | >280 |
| Thiodipropionic | (CH₂)₂S(CH₂)₂ | C₂₈H₂₀N₂O₂S | 22 | 150 |
| Azelaic | (CH₂)₇ | C₂₉H₂₆N₂O₂ | 90 | 89 |

In these experiments, the hydrochloride of the aminophenol was used for convenience in handling. It should be understood that the corresponding aminophenols, free of acids, can be used equally well in this process. Our experiments show that polycyclic ortho-aminophenols can be substituted in any of the reactions of the monocyclic aminophenol, as described in Examples I to X, to produce the analogues of the compounds described in those examples. Similarly, when polycarboxylic acid nitriles, amides, acyl halides, acid anhydrides or esters are substituted for the polycarboxylic acids in reaction with the polycyclic ortho-aminophenols, the reaction products which are obtained are the same as when the polycarboxylic acid is used, as was the case in reaction of those compounds with the monocyclic aminophenols.

EXAMPLE XII

When other polycyclic ortho-aminophenols are substituted in the reaction with polycarboxylic acids or analogous polycarboxyl compounds, analogous reaction products are obtained.

1-amino-2-anthrol hydrochloride (0.1 mole) is mixed with succinic acid (0.05 mole), and the mixture is poured into well-stirred polyphosphoric acid (200 ml.) contained in a three-necked flask at room temperature. The reaction mixture is heated at 150° C. for two hours, and the reaction mixture is worked up as described in Example IV. The product which is obtained is 1,2-bis[2-anthr(1,2)-oxazolyl]ethane.

EXAMPLE XIII 1-amino-2-naphthol hydrochloride (0.1 mole) is mixed with phthalic anhydride (0.05 ml.), and the mixture is poured into well-stirred polyphosphoric acid (200 ml.) contained in a three-necked flask at room temperature. The reaction mixture is heated at 150° C. for two hours, and the product is worked up as described in Example XI. The product which is obtained after recrystallization is substantially pure 1,2-bis[2-naphth(1,2)-oxazolyl]benzene. When 1-amino-2-anthrol hydrochloride is substituted in the same reaction, 1,2-bis[anthr(1,2)-oxazolyl]benzene is obtained as the product.

EXAMPLE XIV 1,2,3 propane tricarboxylic acid (0.1 mole) is mixed with 1-aminophenol (0.3 mole) and added to well-stirred warm polyphosphoric acid (125 ml.) in a three-necked flask. The reaction mixture is heated for one hour at 175° C., after which the product is cooled and poured over ice. The cooled product is washed with water several times, dried in a vacuum desiccator, and purified by recrystallization from ethanol to yield 1,2,3-tris(2-benzoxazolyl)propane in a yield in excess of 90%. The product has the empirical formula C₂₃H₁₇N₃O₃.

EXAMPLE XV 2-amino-1-phenanthrol hydrochloride (0.060 mole) is mixed with 1,3,5-pentane tricarboxylic acid (0.20 mole), and the mixture is poured into well-stirred warm polyphosphoric acid in a three-necked flask. The reaction mixture is heated at 170° C. for three hours, after which it is cooled and poured over ice., and the resulting precipitate separated by filtration. The crude product is washed several times with water, dried in a vacuum desiccator, and then purified by crystallization from ethanol until a constant melting point is obtained. The product obtained in this manner is 1,3,5-tris[2-phenanthr(2,1)-oxazolyl]pentane, in excellent yield.

Trimesic acid (0.1 mole) is mixed with 1-aminophenol (0.3 mole) and added to well-stirred warm polyphosphoric acid (125 ml.) in a three-necked flask. The reaction mixture is heated for 3 hours at 175° C. and poured over ice. The precipitate which forms is separated by filtration, washed several times with water, and dried in a vacuum desiccator. The product is purified by repeated recrystallization from ethanol until a constant melting product is obtained. The product obtained in this reaction is 1,3,5-tris(benzoxazolyl)benzene,

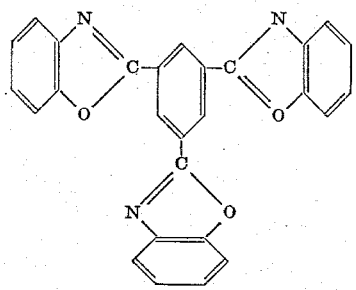

EXAMPLE XVI 7,8-dimethyltetradecane 1,6,9,14-tetracarboxylic acid 0.1 mole) is mixed with 1-aminophenol (0.4 mole) and added to well-stirred warm polyphosphoric acid (125 ml.) in a three-necked flask. The reaction mixture is heated for 2 hours at 175°, the product is cooled and poured over ice, and the precipitate which forms is washed repeatedly with water and dried in a vacuum desiccator. The crude product is then recrystallized from ethanol until a constant melting product is obtained. The product obtained in this reaction is 7,8-dimethyl-1,6,9,14-tetrakis(benzoxazolyl)tetradecane.

EXAMPLE XVII 1,2,4,5 benzene tetracarboxlyic acid (0.1 mole) is mixed with 1-aminophenol (0.4 mole) and added to well-stirred warm polyphosphoric acid (100 ml.) in a three-necked flask. The reaction mixture is heated for two hours at 175° C., and poured over ice. The precipitate which forms is separated by filtration, washed repeatedly with water, and dried in a vacuum desiccator. The product is recrystallized from ethanol until a constant melting product is obtained. The product obtained in this reaction is 1,2,4,5-tetrakis(benzoxazolyl)benzene.

EXAMPLE XVIII

Benzene pentacarboxylic acid (0.1 mole) is mixed with 1-aminophenol (0.5 mole) and added to well-stirred warm polyphosphoric acid (125 ml.) in a three-necked flask, and the reaction mixture is heated for 3 hours at 175° C. The mixture is then cooled and poured over ice. The precipitate which forms is separated by filtration, washed repeatedly with water, and dried in a vacuum desiccator. The crude product is purified by recrystallization from ethanol. The product which is obtained in this reaction is 1,2,3,4,5-pentakis(benzoxazolyl)benzene.

While we have described our invention fully and completely with special emphasis upon several preferred embodiments thereof, we wish it to be understood that within the scope of the appended claims this invention may be practiced otherwise than as specifically described herein.

The embodiments of the invention in which an exclusive property or privilege is claimed are defined as follows:

A compound of the formula

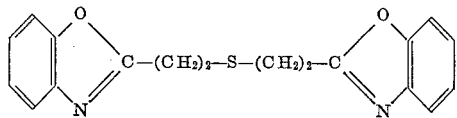

References Cited by the Examiner

UNITED STATES PATENTS

| | | |
|---|---|---|
| 2,149,335 | 3/1939 | Dahlen et al. |
| 2,265,416 | 12/1941 | Bestian. |
| 2,281,583 | 5/1942 | Kranzlein. |
| 2,323,503 | 7/1943 | Wilson _____ 260—307.4 |
| 2,985,661 | 5/1961 | Hein et al. _____ 260—307.4 |

FOREIGN PATENTS 567,665   12/1958   Canada.

OTHER REFERENCES

Conant: The Chemistry of Organic Compounds (New York, 1947), pages 342 and 539–561.

Nyilas et al.: J. Am. Chem. Soc., vol. 82, pages 609–11 (1960).

Ried et al.: Liebigs Ann. Der Chemie, vol. 599, pages 44–50 (1956).

IRVING MARCUS, *Primary Examiner.*

WALTER A. MODANCE, NICHOLAS S. RIZZO,
*Examiners.*